United States Patent

Nakamura

[11] Patent Number: 5,810,533
[45] Date of Patent: Sep. 22, 1998

[54] SCREW FOR FASTENING

[75] Inventor: Daijiro Nakamura, Ono, Japan

[73] Assignee: Power Tool Holders Incorporated, Wilmington, Del.

[21] Appl. No.: 556,956

[22] PCT Filed: Jun. 27, 1994

[86] PCT No.: PCT/IB94/00182

§ 371 Date: Nov. 27, 1995

§ 102(e) Date: Nov. 27, 1995

[87] PCT Pub. No.: WO95/01240

PCT Pub. Date: Jan. 12, 1995

[30] Foreign Application Priority Data

Jun. 30, 1993 [JP] Japan ..................... 5-189208

[51] Int. Cl.$^6$ ............... F16B 23/00; F16B 37/08
[52] U.S. Cl. ............... 411/432; 411/7; 411/408; 411/919
[58] Field of Search ............... 411/1, 6, 7, 402, 411/408, 410, 432, 433, 919; 451/294

[56] References Cited

U.S. PATENT DOCUMENTS

| | | |
|---|---|---|
| 3,614,900 | 10/1971 | Wahlmark . |
| 3,756,092 | 9/1973 | Gartner . |
| 4,434,586 | 3/1984 | Muller et al. . |
| 4,502,824 | 3/1985 | Dohse et al. . |
| 4,841,796 | 6/1989 | Teramachi . |
| 4,864,884 | 9/1989 | Klinkenberg . |
| 4,941,790 | 7/1990 | Kirn ........................... 411/432 |
| 4,955,744 | 9/1990 | Barth et al. ............... 411/428 X |
| 4,976,071 | 12/1990 | Stabler . |
| 4,980,994 | 1/1991 | Helm et al. . |
| 5,022,188 | 6/1991 | Borst . |
| 5,042,207 | 8/1991 | Kirn . |
| 5,161,334 | 11/1992 | Schaal et al. ............ 411/432 X |
| 5,388,942 | 2/1995 | Bonacina et al. ............ 411/432 |

FOREIGN PATENT DOCUMENTS

| | | |
|---|---|---|
| 0034640A1 | 9/1981 | European Pat. Off. . |
| 0231500B1 | 8/1987 | European Pat. Off. . |
| 0480163A1 | 4/1992 | European Pat. Off. . |
| 0497138A1 | 8/1992 | European Pat. Off. . |
| 0588483A2 | 3/1994 | European Pat. Off. . |
| 0600854A1 | 6/1994 | European Pat. Off. . |
| 3012836C2 | 9/1985 | Germany . |
| 3523746A1 | 1/1987 | Germany . |
| 3702142A1 | 8/1988 | Germany . |
| 3824040C1 | 11/1989 | Germany . |
| 3903765A1 | 8/1990 | Germany . |
| 3903766A1 | 8/1990 | Germany . |
| 3613987C2 | 9/1990 | Germany . |
| 4102420A1 | 7/1992 | Germany . |
| 4209146A1 | 9/1992 | Germany . |
| 4238466C1 | 1/1994 | Germany . |
| 4243328C1 | 6/1994 | Germany . |
| 4305317A1 | 9/1994 | Germany . |
| WO9204549 | 3/1992 | WIPO . |

OTHER PUBLICATIONS

PCT International Search Report–PCT/IB94/00182.
Abstract of EP 345,271–A–Dated Feb. 21, 1987.
Abstract of EP 330,672–Dated Jan. 15, 1987.
Abstract of EP 558,277 A1–Dated Feb. 28, 1992.
Abstract of DE 3903–765–A–Dated Feb. 9, 1989.
Abstract of DE 3903–766–A–Dated Feb. 9, 1989.
Abstract of DE 4102420–A–Dated Jan. 28, 1991.
Abstract of DE 3824–040–C–Dated Jul. 15, 1988.
Abstract of DE 3613–987–A–Dated Apr. 25, 1986.
Abstract of DE 3523–746–A–dated Jul. 3, 1985.
Abstract of DE 3012–836–Dated Apr. 2, 1980.

*Primary Examiner*—Neill R. Wilson
*Attorney, Agent, or Firm*—Dority & Manning

[57] ABSTRACT

A screw for fastening that includes a male or female screw formed on its inner core area and including threads located about its outer circumference. A flange ring is located generally at one edge of the screw member in a manner so to be free to turn relative to the screw member, with the outside surface of the flange ring being configured to contact an object to be attached. An operating ring is located at the other edge of the screw member with freedom to turn relative to the screw. A screw feed ring is also provided having threads engaged with threads on the outer circumference of the screw member. A holding ring portion is operatively associated with the operating ring and includes an inner surface that is eccentric to its outer surface.

7 Claims, 4 Drawing Sheets

SCREW FOR FASTENING

DETAILED DESCRIPTION OF THE INVENTION

1. Field of Industrial Use

The present invention relates to a screw for fastening such as an attachment bolt or an attachment nut used to secure a rotational tool, such as the grindstone of a hand grinder or a circular hand saw, for example, to the drive shaft of an electrically powered tool.

2. Prior Art

Conventionally, in order to attach a rotational tool such as the grindstone or circular saw mentioned above to the drive shaft of an electrically powered tool, a flange and bolt are formed on the end of the drive shaft, the rotational tool is impaled on the bolt portion and a nut screwed onto the outside thereof, and the nut is fastened to secure the rotational tool between the said nut and the above-mentioned flange.

However, there are problems in using the above-mentioned rotational tool in that, if the said rotational tool is used in an impacting fashion, the nut becomes tighter than necessary due to the impact and the reaction thereto, so that the nut is too tight when the rotational tool is to be removed and it cannot be removed even if a wrench is used.

Additionally, the above-mentioned operations of fastening and loosening the nut have problems in that normal practice is to employ a force-enhancing tool such as a wrench, but the force with which the nut is fastened or loosened is amplified only by the force-enhancing tool and adequate amplification can therefore not be achieved.

PROBLEMS TO BE SOLVED BY THE INVENTION

The present invention aims to provide a screw for fastening whereby the screw member can be readily removed by preventing the screw member from becoming too tight due to the rotational force caused by reaction to use of the rotational tool in an impacting fashion.

Additionally, it aims to provide a screw for fastening which gives a substantial fastening force and a strong loosening force for a minor rotational input, and which can be strongly fastened and loosened by turning it in a direct manual rotating operation without using a power-enhancing tool.

Again, it aims to provide a screw for fastening which can be compactly constructed and has good operating properties.

MEANS OF RESOLVING THE PROBLEMS

The invention disclosed in claim 1 of the invention is characterised in that it is a screw for fastening which is provided with a screw member with a female screw or a male screw formed in its core area; a flange ring which is fitted around the outer circumferential area of one edge of said screw member with freedom to turn relative to said screw member, and the outside surface of which makes contact with the object to be attached; an operating ring which is fitted around the outer circumferential area at the other edge of the above-mentioned screw member with freedom to turn relative to said screw member, which operating ring faces the above-mentioned flange ring, separated from it by a prescribed separation, and which inputs the operational rotational force; a screw feed ring which is positioned in the interval between the above-mentioned flange ring and the above-mentioned operating ring, which is held off-center by having part of its female screw area, which is provided on the relevant inner circumferential portion, mesh with the male screw area provided on the outer circumferential area of the screw member in the said positioning interval, and which transmits screw feed caused by revolution to the above-mentioned flange ring in the thrust direction; and a holding ring fitted around the outer circumferential area of the above-mentioned screw feed ring, which permits revolution of the said screw feed ring by holding the said screw feed ring off-center.

The invention claimed in claim 2 of the invention is characterised in that it is a screw for fastening which, in addition to having the configuration of the invention claimed in claim 1 mentioned above, is a screw for fastening in which a reverse screw ring regulated to a predetermined screw feed amount is screwed onto the outer circumference of the above-mentioned screw member; the outer circumference of the said reverse screw ring is provided with a male screw area meshing with part of the female screw area of the above-mentioned screw feed ring; and in which a rotation transmitting member, which transmits the rotation of the operating ring to the reverse screw ring and which slips at more than a predetermined load, is inserted in the region where the outer circumferential area of the other edge of the above-mentioned reverse screw ring and the inner circumferential area of the above-mentioned operating ring face each other.

The invention claimed in claim 3 of the invention is characterised in that it is a screw for fastening which, in addition to the configuration of the invention claimed in claim 1 mentioned above, is a screw for fastening in which a torque limiter, which cuts off the rotational force from the flange ring at a predetermined load, is inserted between the facing surfaces of the said flange ring and screw member.

As regards the invention disclosed in claim 1 of the invention, a rotational force is input by fitting the screw of the screw member to the screw area on the side where the object to be attached is and turning the operating ring in the fastening direction, whereupon the screw member also turns in the fastening direction under the frictional resistance of the internal structural elements and is screwed onto the screw area where the object to be attached is.

Once the outside surface of the flange ring has come into contact with the object to attached due to this screw fitting action, the contact load is applied via the screw feed ring to the screw member, so that the screw member is prevented from turning and only the turning operation of the operating ring is permitted.

If the operating ring in this state experiences a further rotational force input in the fastening direction, the screw feed ring is supported via the holding ring in a state off-center of the operating ring and, therefore, the screw feed ring revolves under the rotation of the operating ring, and part of the female screw area of the screw feed ring is screwed onto the male screw area on the screw member side and, therefore, the screw feed ring is screw fed to the flange ring side accompanying the revolution mentioned above, and this screw feeding action is transmitted to the flange ring and the relevant surface of the said flange ring is pressured, under the force in the thrust direction, into contact with the object to be attached, which is thereby secured. In other words, without turning the screw member, the object to be attached is pressed into contact and secured via the flange ring under the force of the screw feed ring in the thrust direction. Moreover, the screw feed of the screw feed ring discussed above is stepped down by $$P(1 - D_1/D_2)$$

where,

P = the screw pitch of the female screw area of the screw feed ring, and the male screw area on the screw member side which screws onto the said female screw area D1 = the independent effective diameter of the male screw area on the screw member side D2 = the independent effective diameter of the female screw area of the screw feed ring, and, therefore, the torque of the rotational force of the operating ring is increased by the amount of step-down, and the flange ring is pressed into contact under a substantial force in the thrust direction, and the object to be attached can be strongly fastened.

Moreover, when the attached object is to be removed, the operating ring is rotated in the opposite direction to that mentioned above (the unfastening direction). Because there is a high pressure-contact load from the flange ring on the object to be attached in the initial stages of the rotation, then, if the operating ring is rotated in the opposite direction, the screw feed ring can rotate backwards under a rotational force of increased torque in the same way as described above, the said screw feed ring can be returned to the initial position prior to screw feeding, and the pressure contacting of the flange ring on the object to be fitted is released by this returning action, and, therefore, the load from the flange ring side of the screw member is released, the rotation of the operating ring is transmitted to the screw member by the frictional resistance of the internal structural elements, and the screw member can be made to rotate in reverse and can be removed by turning the operating ring.

In the invention described in claim 2 of the invention, in addition to the action of the invention described in claim 1 mentioned above, rotating the operating ring in the fastening direction prevents the screw member from rotating and, if the operating ring experiences a rotational force input in the fastening direction, the reverse screw ring first experiences a rotational force from the operating ring via the rotational-transmitting member and is screw fed to the fastening side as far as the regulated position, the reverse screw ring is regulated and stops rotating, and then the rotation-transmitting member slips with respect to the operating ring so that the rotational force is cut off, and this means that the screw feed ring revolves and is screw fed as described above so that the object to be attached is pressed into contact and secured in the thrust direction, via the flange ring, due to the screw feeding action of the said screw feeding ring.

The object to be attached is removed by the reverse rotation of the operating ring: until the pressure contact of the flange ring loosens, the operating ring and the rotation-transmitting member slip, the screw feed ring revolves and withdraws and then the pressure contact of the flange ring is released, whereupon the rotation of the operating ring is transmitted via the rotation-transmitting member to the reverse screw ring which is withdrawn, and the above-mentioned screw feed ring and reverse screw ring can be returned to the initial position by having this withdrawing action proceed as far as the regulating position.

In the invention described in claim 3 of the invention, in addition to the action of the invention described in claim 1 mentioned above, once an impact load from the object to be attached is applied to the flange ring, the said impact load is cut off by the torque limiter once it has exceeded the setting load of the torque limiter, thereby permitting the flange ring to rotate and making it possible to avoid the impacts mentioned above, and, moreover, making it possible to prevent the said impact load from acting on the screw feed ring, reverse screw ring, screw member, holding ring, operating ring and the like.

Using the present invention, the object to be attached is pressed into contact and secured under the force of the flange ring in the thrust direction and this pressurized contact has no energy component in the direction of rotation, which means that the screw member can be reliably prevented from becoming too tight due to rotational forces caused by reaction to the use of the said rotational tool in an impacting fashion (when, by way of example, the object to be attached is a rotational tool), and the screw member can be readily removed. Moreover, the impact load of the rotational tool mentioned above is cut off by the torque limiter, thereby making it possible to prevent damage to the rotational tool from the impact load, and also to prevent damage to the internal parts of the screw for fastening.

In addition, the screw feed ring presses the flange ring under a force of increased torque and this gives a substantial fastening force and strong loosening force on the flange ring for a minor rotational input at the operating ring, and it is also possible to fasten and loosen the device strongly by a direct manual rotating operation without using a power-enhancing tool.

In addition, by inserting a reverse screw ring between the screw member and the screw feed ring, the screw feed ring is more reliably returned to the initial position and a good operating mode is obtained.

In addition, housing structural elements such as the flange ring, operating ring, screw feed ring, reverse screw ring and the holding ring in the area around the screw member gives a screw for fastening which is compactly constructed and has a good operating performance.

BRIEF DESCRIPTION OF THE DIAGRAMS

DETAILED DESCRIPTION OF PREFERRED EMBODIMENTS

An embodiment of the invention is now described based on the following figures.

Figure 1:
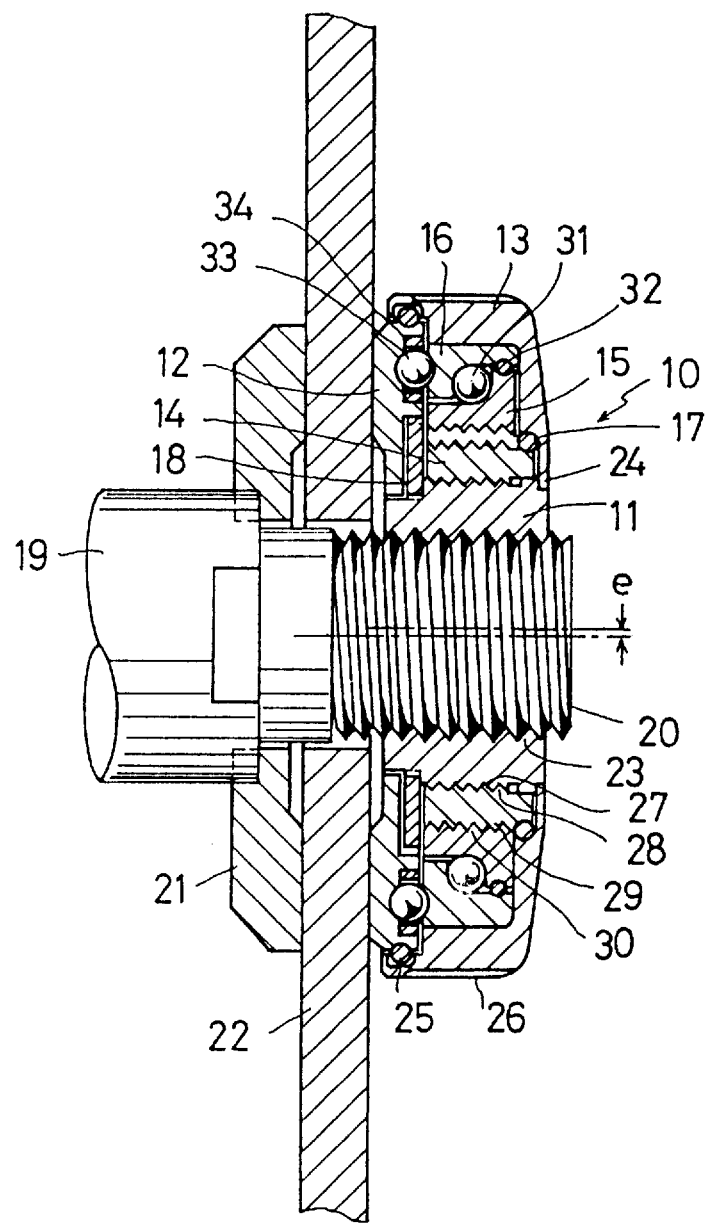
FIG. 1 is a cross-sectional diagram of a screw for fastening.
Figure 2:
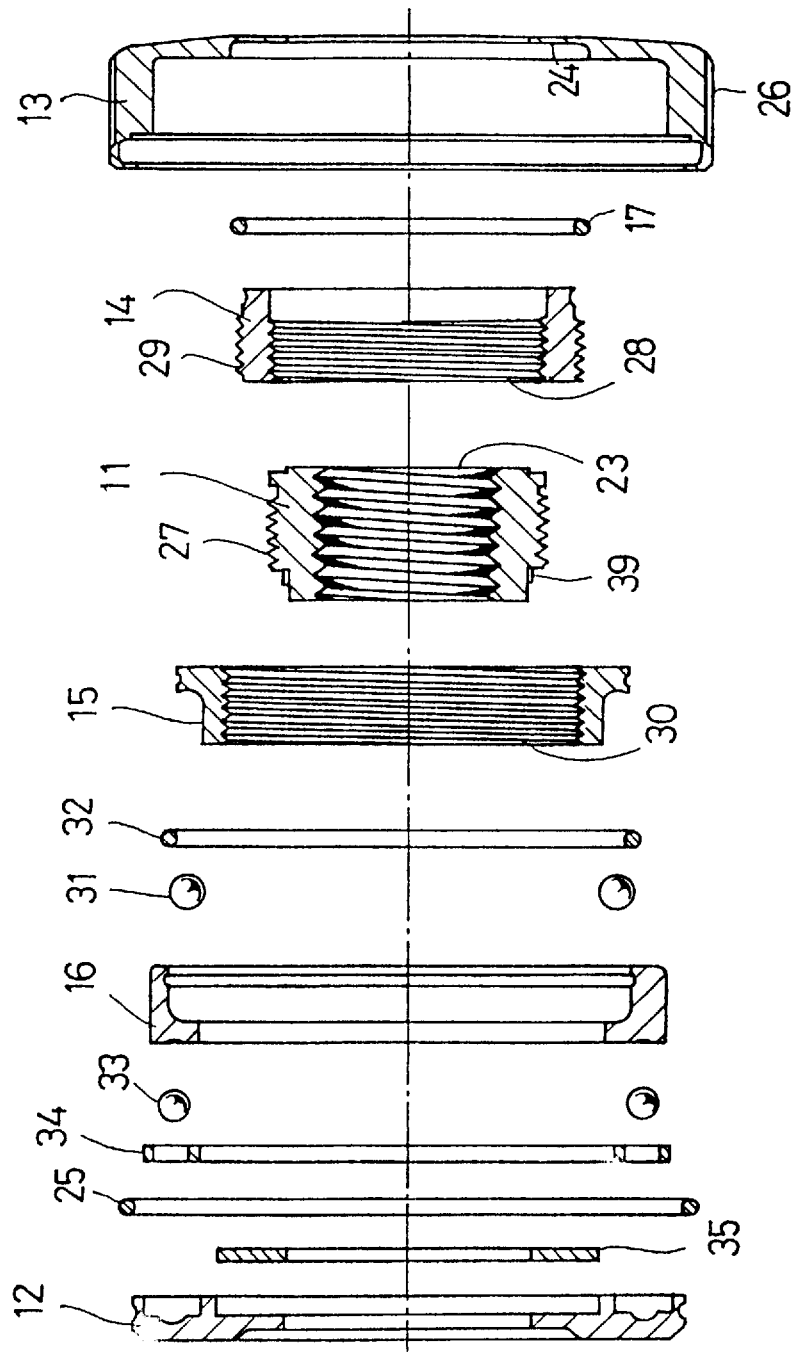
FIG. 2 is an exploded cross-sectional diagram of a screw for fastening.

The figures show a screw for fastening which has been formed in a nut shape: in FIG. 1 and FIG. 2, the said screw 10 for fastening comprises a screw member 11, a flange ring 12, an operating ring 13, a reverse screw ring 14, a screw-feed ring 15, a holding ring 16, an O-ring 17 which is a rotation-transmitting member, and a torque limiter 18; and, by way of example, the screw 10 for fastening secures the rotational tool 22, which is the object to be attached, for example the grindstone of a hand grinder, between itself and an inner flange 21 attached to the drive shaft 19 of an electrically powered tool by screwing onto the attachment bolt 20 of the said drive shaft 19.

As regards the screw member 11 of the screw 10 for fastening mentioned above, it is provided on the inner circumference of its shaft core portion with a female screw 23 which screws onto the attachment bolt 20 of the above-mentioned drive shaft 19, it has stepped areas formed on both the inside and outside edges of its outer circumferential area, it has a flange ring 12 rotatably fitted around its inside edge, and it has the regulating area 24 of the operating ring 13 rotatably fitted around its outside edge side.

The inside of the above-mentioned operating ring 13 is formed in a recessed shape, thereby forming a space within it, and the inside of its outside edge overlaps with the outer circumferential area of the above-mentioned flange ring 12, and an O-ring 25 is inserted to seal the said overlapping portion. Further, a knurled rim 26 is formed at the outer circumferential area of the above-mentioned operating ring 13, thereby facilitating manual rotational input.

A male screw area 27 is provided on the outer circumferential area of the above-mentioned screw member 11 in the central area sandwiched between the stepped areas at both edges, and a female screw area 28 provided on the inner circumference of the above-mentioned reverse screw ring 14 is screwed onto this male screw area 27 so that, when a rotational force is applied to this reverse screw ring 14, the reverse screw ring 14 is screw fed slightly forwards or backwards within a range regulated by the regulating area 24 of the operating ring 13 and the torque limiter 18, for example a range of about 1 mm.

Further the above-mentioned O-ring 17 is inserted in the region where the outer circumference on the outside edge of the above-mentioned reverse screw ring 14 and the inner circumferential area of the above-mentioned operating ring 13 face each other, this O-ring 17 being provided not only for its sealing action, but also to rotate the reverse screw ring 14 by transmitting the rotational force of the operating ring 13 by frictional resistance, and also to slip the transmission when the return screw ring 14 experiences a load from the flange ring 12 side.

A male screw area 29 is provided on the outer circumferential area of the above-mentioned return screw ring 14, while a female screw area 30 with a screw diameter slightly larger than that of, and a screw pitch the same as that of the above-mentioned male screw area 29 is provided on the inner circumferential surface of the above-mentioned screw feed ring 15, and the screw feed ring 15 is off-centered by an off-centering amount e such that part of the said female screw area 30 meshes with the above male screw area 29, and the holding ring 16 holds this off-center position of the screw feed ring 15 via bearings 31. Moreover, the holding ring 16 is secured by insertion under pressure against the recessed inner surface of the operating ring 13. Further, an O-ring 32 is inserted between the above-mentioned screw feed ring 15 and the holding ring 16.

There is play between the operating ring 13 and the flange ring 12 such that the whole of the operating ring 13 can move to the flange ring 12 when the screw feed ring 15 is screw fed by a prescribed amount, for example about 1 mm.

Thrust bearings 33 are inserted between the facing surfaces of the above-mentioned holding ring 16 and the above-mentioned flange ring 12, and the said thrust bearings 33 are held in a retainer 34 fitted into a recess in the flange ring 12.

Figure 3:
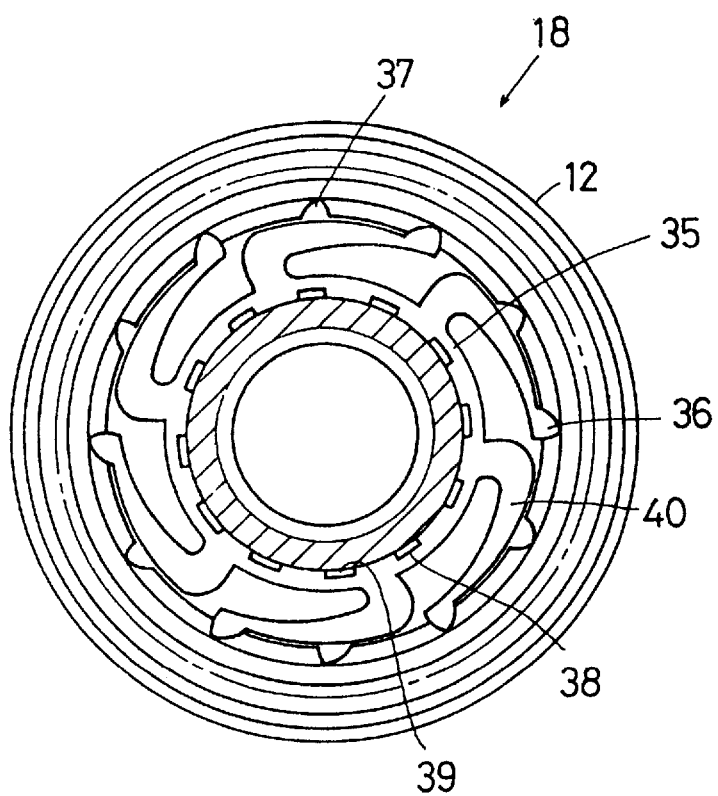
FIG. 3 is a side elevation of a torque limiter.

As shown in FIG. 3, the above-mentioned torque limiter 18 comprises a resilient ring 35, and a plurality of recessed areas 37 in the flange ring 12 which engage with a plurality of claws 36 formed in this resilient ring 35. Spline channels 38 are provided in the inner circumferential area of the above-mentioned resilient ring 35, and the spline channels 38 engage with spline claws 39 formed in the recesses of the stepped area on the inside of the screw member 11 with which they turn in an integral fashion. Further, the plurality of claws 36 . . . are formed at the ends of arms 40 which resiliently alter position in the inward and outward direction, and the arms 40 will alter position and slip to cut off any driving forces if a rotational force larger than the resiliency set in the arms 40 is transmitted from the flange ring 12 to the resilient ring 35.

The operation of a screw 10 for fastening which has been constructed in this manner is described below.

In attaching the above-mentioned rotational tool 22 to the attachment bolt 20 of the drive shaft 19 using the above-mentioned screw 10 for fastening, the flange ring 12 side of the screw 10 for fastening is made to face the side with the rotational tool 22, the female screw 23 of the screw member 11 of the screw 10 for fastening is fitted to the attachment bolt 20, and the knurled rim 26 portion of the operating ring 13 is turned directly by hand in the fastening direction, thereby screwing on the female screw 23.

When the flange ring 12 is not in contact with the rotational tool 22 during this screwing-on action, the rotation of the operating ring 13 is transmitted to the screw member 11 by the internal resistance of the various elements formed on the inside of the operating ring 12, for example by the frictional resistance of such elements as the reverse screw ring 14, screw feed ring 15, holding ring 16 and torque limiter 18, and the said screw member 11 turns in the fastening direction and is screwed onto the attachment bolt 20.

Once the outside face of the flange ring 12 has come into contact with the side surface of the rotational tool 22 due to this screwing-on action, the contacting load acts on the screw member 11 via the thrust bearings 33, holding ring 16, bearings 31, screw feed ring 15, return screw ring 14 or torque limiter 18, and the screw member 11 is prevented from turning.

If, in this state, the operating ring 13 is again rotated in the fastening direction, the return screw ring 14 is screw fed by the meshing of the male and female screw areas 27 and 28 under the frictional resistance of the O-ring 17 (a feed of about 1 mm), and the inside edge comes into contact with the resilient ring 35 of the torque limiter 18 and is regulated, slip occurs between the O-ring 17 and the return screw ring 14 and only the turning operation of the operating ring 13 is permitted.

If, in this state, the operating ring 13 is again rotated in the fastening direction, the screw feed ring 15 is supported, via the holding ring 16, in a state off-centered from the operating ring 13, and, therefore, the screw feed ring 15 revolves under the rotation of the operating ring 13, and, because part of the female screw area 30 of the screw feed ring 15 is meshed with the male screw area 29 of the reverse screw ring 14, the screw feed ring 15 is screw fed (feed of about 1 mm) to the flange ring 12 side, and this screw feeding is transmitted by the bearing 31, the holding ring 16 and the thrust bearings 33 to the flange ring 12, and the said side face of the said flange ring 12 is pressured into contact with the rotational tool 22 and secures it under the force in the thrust direction.

Moreover, the screw feed of the above-mentioned screw feed ring 15 is stepped down by $$P (1-D1/D2)$$

where,
P=the screw pitch of the female screw area 30 of the screw feed ring 15, and the male screw area 29 of the reverse screw ring 14
D1=the independent effective diameter of the male screw area 29 of the reverse screw ring 14

D2=the independent effective diameter of the female screw area 29 of the screw feed ring 15, and, therefore, the torque of the rotational force of the operating ring 13 is increased by the amount of step-down, and the flange ring 12 is pressed into contact under a substantial force, and the rotational tool 22 can be strongly fastened in the thrust direction.

As regards the use of a rotational tool 22 attached as described above, if the flange ring 12 experiences an impact load due to the use of the said rotational tool 22 in an impacting fashion, and if the said impact load is greater than the set load of the torque limiter 18, which is to say the resilience set in the arms 40 of the resilient ring 35, then the claws 36 come away from the recessed areas 37, the said impact load is cut off by the torque limiter 18 and the flange ring 12 is permitted to rotate so that the above-mentioned impact can be avoided, and the said impact load can be prevented from acting on the holding ring 16, bearings 31, screw feed ring 15, reverse screw ring 14 and screw member 11.

Moreover, when the rotational tool 22 is to be removed, the operating ring 13 is rotated in the opposite direction to that mentioned above (the unfastening direction). Because there is a high pressure-contact load from the flange ring 12 on the rotational tool 22 in the initial stages of the rotation, if the operating ring 13 is rotated in the opposite direction, the operating ring 13 and the O-ring 17, which is the rotation-transmitting member, slip and the screw feed ring 15 revolves and withdraws until the pressure contact of the flange ring 12 is relaxed.

Once the pressure contact of the flange ring 12 has then been released, the rotation of the operating ring 13 causes the reverse screw ring 14 to withdraw via the O-ring 17 and, if this withdrawal proceeds to the position regulated by the regulating area 24 of the operating ring 13, then the above-mentioned screw feed ring 15 and the reverse screw ring 14 can be returned to the initial position.

If, once they have been returned to the initial position as described above, the operating ring 13 is again turned in the removal direction, then the whole unit turns under internal resistance as described above and the screw member 11 is made to turn backwards and can be removed from the attachment bolt 20.

Figure 4:
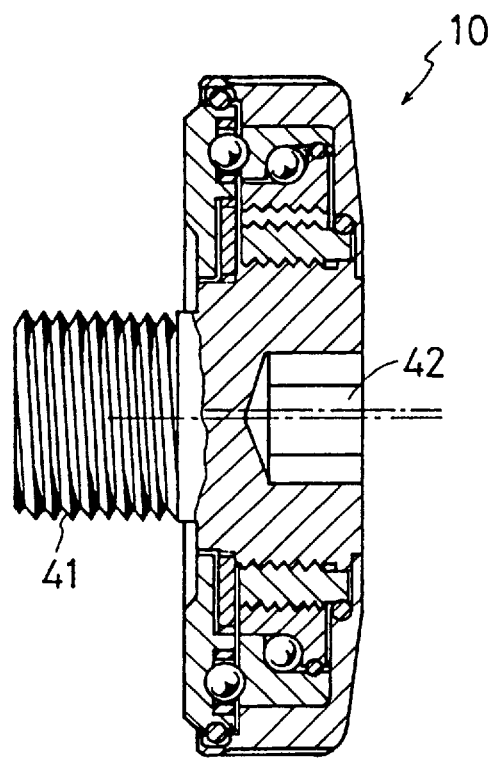
FIG. 4 is a cross-sectional diagram showing another example of a screw for tightening.

Moreover, the screw member 11 in the above embodiment was formed in a nut shape by providing a female screw 23 in its core area, but it can also be constructed in a bolt form by providing a male screw 41 in the core area of the screw member 11 as shown in FIG. 4. In this figure, 42 is a hexagonal hole and is constructed such that it can be turned by a hexagonal wrench. A detailed explanation of the rest of the construction is omitted in view of the fact that it is the same as the embodiment described above.

By constructing the invention in this way, the rotational tool 22 is secured in pressurized contact under the force of the flange ring 12 in the thrust direction, and this pressurized contact has no energy component in the direction of rotation and, therefore, the screw member 11 can be reliably prevented from being over-tightened due to rotational forces stemming from the reaction to use of the rotational tool 22 in an impactive fashion, and the screw member 11 can be readily removed. Moreover, the impact load of the rotational tool 22 mentioned above is cut off by the torque limiter 18 so that damage to the rotational tool 22 by the impact load can be prevented and, at the same time, damage to the internal parts of the screw 10 for fastening can also be prevented.

Moreover, because the flange ring 12 is pressed under the force of increased torque of the screw feed ring 15, a substantial fastening force and a strong loosening force are obtained at the flange ring 12 for a minor rotational input at the operating ring 13, and the device can be strongly fastened and loosened by a direct manual rotating operation without using a force-enhancing tool.

Moreover, because the reverse screw ring 14 is inserted between the screw member 11 and the screw feed ring 15, the screw feed ring 15 can be more reliably returned to its initial position and a favorable state of use is achieved.

Furthermore, because it comprises a construction with a flange ring 12, operating ring 13, reverse ring 14, screw feed ring 15, holding ring 16 and the like on the outer circumferential area of a screw member 11, this invention can provide a crew for fastening which can be constructed compact y and has good operational properties.

Again, the screw 10 for fastening can be constructed by forming the screw member 11 and the reverse screw ring 14 in the embodiment integrally.

Also, when the fastening load of the screw 10 for fastening is small, the torque limiter 18 shown in the embodiment described above may be omitted and the flange ring 12 may be directly connected to the screw member 11 by spline fitting. In this case, better results are obtained by arranging the construction such that there is somewhat more play in the spline fitting and movement in the axial direction is easy.

What is claimed is:

1. A screw for fastening, said screw comprising:
    a screw member with a female or a male screw formed in its inner core area and including threads located about at least a portion of its outer circumference;
    a flange ring located generally at one edge of said screw member in a manner so as to be free to turn relative to said screw member, the outside surface of said flange ring being configured to contact an object to be attached;
    an operating ring located generally at the other edge of said screw member with freedom to turn relative to said screw member, a portion of the operating ring facing the flange ring, separated from it by a predetermined separation, said operating ring providing for input of the operational rotational force;
    a screw feed ring, said screw feed ring having threads that operatively engage with threads on the outer circumference of the screw member;
    a holding ring portion operatively associated with said operating ring, said holding ring portion including an inner surface that is eccentric to its outer surface, said eccentric surface being configured so as to hold the screw feed ring in a position off center with respect to the screw member so that as the holding ring is rotated, it forces the screw feed ring to eccentrically rotate around the screw member and therefore provide axial force on the flange ring to maintain the screw for fastening securely in position.

2. A screw for fastening as in claim 1, wherein said holding ring portion is a separate component from said operating ring.

3. A screw for fastening as in claim 1, and further including a reverse screw ring, said reverse screw ring having threads on its internal circumference for mating with the threads on the outer surface of said screw member and threads on its external circumference for mating with the threads on the screw feed ring, the operative engagement between said threads on the screw feed ring and the screw member being through the reverse screw ring.

4. A screw for fastening as in claim 3, and further including a rotation transmitting member between the operating ring and the reverse screw ring, said rotation transmitting member being configured to slip at a predetermined load.

5. A screw for fastening as in claim 1, and further including a torque limiting mechanism, said torque limiting mechanism being configured to disengage rotational force between the flange ring and the screw member at a predetermined load.

6. A screw for fastening, said screw comprising:

a screw member with a female or a male screw formed in its inner core area and including threads located about at least a portion of its outer circumference;

a flange ring located generally at one edge of said screw member in a manner so as to be free to turn relative to said screw member, the outside surface of said flange ring being configured to contact an object to be attached;

an operating ring located generally at the other edge of said screw member with freedom to turn relative to said screw member, a portion of the operating ring facing the flange ring, separated from it by a predetermined separation, said operating ring providing for input of the operational rotational force;

a screw feed ring and a reverse screw ring, said screw feed ring having threads that engage with threads on the reverse screw ring, said reverse screw ring having threads that engage the threads on the outer circumference of the screw member;

a holding ring portion operatively associated with said operating ring, said holding ring portion including an inner surface that is eccentric to its outer surface, said eccentric surface being configured so as to hold the screw feed ring in a position off center with respect to the screw member and reverse screw ring so that as the holding ring is rotated, it forces screw feed ring to eccentrically rotate around the screw member reverse screw ring and therefore provide axial force on the flange ring to maintain the screw for fastening securely in position.

7. A screw for fastening as in claim 6, wherein said reverse screw is permitted a limited amount of movement with respect to said screw member.

* * * * *

UNITED STATES PATENT AND TRADEMARK OFFICE
CERTIFICATE OF CORRECTION

PATENT NO. : 5,810,533
DATED : September 22, 1998
INVENTOR(S) : Daijiro Nakamura It is certified that error appears in the above-indentified patent and that said Letters Patent is hereby corrected as shown below:

In the Abstract,
Line 4, after "so" add the word "as"

In the Detailed Description of Preferred Embodiments,
In Column 8, Line 14, please change "crew" to "screw"
In Column 8, Line 15, please change "compact y" to "compactly"

Signed and Sealed this

Ninth Day of March, 1999

Attest:

Attesting Officer

Q. TODD DICKINSON

Acting Commissioner of Patents and Trademarks

BEST AVAILABLE COPY